(12) United States Patent
De Diego Arozamena et al.

(10) Patent No.: US 7,657,478 B2
(45) Date of Patent: Feb. 2, 2010

(54) METHOD FOR ESTIMATING EXPECTED CASH FLOW OF AN INVESTMENT INSTRUMENT

(75) Inventors: Alfredo De Diego Arozamena, New York, NY (US); Cristina Polizu, Great Neck, NY (US); Ming Tang, New York, NY (US)

(73) Assignee: Standard & Poor's Financial Services LLC, New York, NY (US)

( * ) Notice: Subject to any disclaimer, the term of this patent is extended or adjusted under 35 U.S.C. 154(b) by 701 days.

(21) Appl. No.: 11/333,541

(22) Filed: Jan. 18, 2006

(65) Prior Publication Data

US 2007/0168270 A1 Jul. 19, 2007

(51) Int. Cl.
*G06Q 40/00* (2006.01)
(52) U.S. Cl. .................................................... 705/36 R
(58) Field of Classification Search .................... 705/36
See application file for complete search history.

(56) References Cited

U.S. PATENT DOCUMENTS

2001/0039525 A1* 11/2001 Messmer et al. ............... 705/36
2003/0028463 A1* 2/2003 Long et al. ..................... 705/36
2003/0033229 A1* 2/2003 Keyes et al. ................... 705/36

OTHER PUBLICATIONS

Heckman, James J. Earnings Functions, Rates of Return, and Treatment Effects: the Mincer Equation and Beyond. National Bureau of Economic Research. Aug. 2005.*

Gordon, Lawrence A. Rates of Return and Cash Flow Profiles: An Extension. The Accounting Review. vol. 63, No. 3. Jul. 1988.*

Anderson, Gary A. Project Holding-Period Rate of Return and the MIRR.*

Murray, Gordon C. Why has the investment performance of technology-specialist, European venture capital funds been so poor?*

* cited by examiner

*Primary Examiner*—Alexander Kalinowski
*Assistant Examiner*—John O Preston
(74) *Attorney, Agent, or Firm*—Rothwell, Figg, Ernst & Manbeck, PC

(57) ABSTRACT

A method for estimating future cash flows of an investment instrument (or portfolio of investment instruments) is performed by simulating past performance (i.e., cash flows) similar instruments based on actual data of past performance, using the simulated past performance to generate a distribution of possible future performance outcomes of the investment instrument, and using the distribution of possible future performance outcomes to make estimates of the expected cash flow from the investment instrument. In one embodiment, cash flow time series of private equity funds (J-curves) are simulated for fully-liquidated vintage years by scaling an aggregate net cash flow time series from a plurality of fully liquidated funds for that vintage year. The time series is scaled by scalar coefficients calculated based on statistics of the four parameters, internal rate of return, money multiple, depth of curve, and speed to depth, of the aggregated vintage fund J-curves.

24 Claims, 12 Drawing Sheets

STAGES OF PRIVATE EQUITY AS AN ASSET CLASS

NET CASH FLOW TABULATION FOR
HYPOTHETICAL PRIVATE EQUITY FUND

| YEAR | INC DD | CUMM DD | INC DIS | CUM DIST | NCF |
|---|---|---|---|---|---|
| 0 | 0 | 0 | 0 | 0 | 0 |
| 1 | -20 | -20 | +1 | +1 | -19 |
| 2 | -25 | -45 | 0 | +1 | -44 |
| 3 | -15 | -60 | 3 | 4 | -56 |
| 4 | -20 | -80 | 15 | 19 | -61 |
| 5 | -20 | -100 | 35 | 54 | -46 |
| 6 | 0 | -100 | 25 | 79 | -21 |
| 7 | 0 | -100 | 35 | 114 | 14 |
| 8 | 0 | -100 | 32 | 146 | 46 |
| 9 | 0 | -100 | 22 | 168 | 68 |
| 10 | 0 | -100 | 0 | 168 | 68 |

FIG. 2

| REPORT DATE AS OF 12/31/2004 | | | | BUYOUT FUNDS | | | | | |
|---|---|---|---|---|---|---|---|---|---|
| CALCULATION TYPE : IRR | | | PRIMARY MARKET : US | | | | | | |
| VINTAGE YEAR | NUM | AVG | CAP WTD AVG | POOLED AVG | MAX | UPPER | MED | LOWER | MIN |
| 1980-83 | 8 | 44.8 | 33.4 | 36.8 | 146.7 | 41.5 | 36.2 | 22.4 | 11.1 |
| 1984 | 6 | 35.2 | 28.3 | 26 | 124.8 | 30.6 | 23.9 | 6.2 | 2.1 |
| 1985 | 8 | 53.7 | 43 | 57.3 | 243.9 | 46.9 | 28.2 | 15.2 | 4.8 |
| 1986 | 10 | 18.2 | 17.9 | 19 | 64.5 | 18.7 | 15.8 | 7.8 | 2.2 |
| 1987 | 23 | 13.8 | 14 | 13.1 | 65.2 | 16 | 10.4 | 6.8 | -17.6 |
| 1988 | 14 | 8.8 | 9.9 | 11.3 | 28.7 | 13.1 | 9.2 | 0 | -8.5 |
| 1989 | 25 | 12.9 | 18.1 | 17.4 | 57.8 | 21.5 | 12.4 | 6.8 | -42.2 |
| 1990 | 10 | 8.9 | 18.8 | 20.1 | 54.2 | 19.5 | 8.1 | -0.9 | -31.2 |
| 1991 | 5 | 11.1 | 11 | 9.6 | 22.4 | 15 | 13 | 5.5 | -0.2 |
| 1992 | 18 | 19.3 | 23.9 | 20.4 | 60.1 | 22.5 | 18.5 | 10 | -23.4 |
| 1993 | 22 | 19.6 | 21 | 18.5 | 57 | 25.4 | 15.7 | 9.8 | 0.2 |
| 1994 | 29 | 16.9 | 19.2 | 14.7 | 91.3 | 22.7 | 12.2 | 1.7 | -8.4 |

FIG. 5

| REPORT DATE AS OF 12/31/2004 | | | | BUYOUT FUNDS | | | | | |
|---|---|---|---|---|---|---|---|---|---|
| CALCULATION TYPE : MM | | | | PRIMARY MARKET : US | | | | | |
| VINTAGE YEAR | NUM | AVG | CAP WTD AVG | POOLED AVG | MAX | UPPER | MED | LOWER | MIN |
| 1980-83 | 8 | 5.23 | 3.37 | 3.31 | 12.98 | 5.87 | 4.85 | 2.99 | 1.41 |
| 1984 | 6 | 3.73 | 4.09 | 4 | 8.27 | 4.98 | 3.11 | 1.69 | 1.21 |
| 1985 | 8 | 4.05 | 3.34 | 3.06 | 18.22 | 2.7 | 2.26 | 1.89 | 0.47 |
| 1986 | 10 | 2.69 | 2.77 | 2.62 | 9.18 | 2.82 | 1.96 | 1.29 | 0.34 |
| 1987 | 23 | 1.77 | 1.71 | 1.71 | 4.53 | 2.01 | 1.57 | 1.25 | 0.25 |
| 1988 | 14 | 1.6 | 1.61 | 1.6 | 4.33 | 2.18 | 1.35 | 0.71 | 0.31 |
| 1989 | 25 | 1.7 | 1.96 | 1.94 | 3.67 | 2.3 | 1.66 | 1.11 | 0.01 |
| 1990 | 10 | 1.2 | 1.87 | 2 | 2.94 | 1.72 | 1.17 | 0.15 | 0.03 |
| 1991 | 5 | 0.98 | 1.11 | 1.26 | 1.95 | 1.49 | 1.43 | 0 | 0 |
| 1992 | 18 | 1.73 | 1.61 | 1.66 | 4.28 | 2.02 | 1.74 | 0.99 | 0 |
| 1993 | 22 | 1.57 | 1.53 | 1.55 | 3.63 | 1.86 | 1.52 | 1.14 | 0 |
| 1994 | 29 | 1.28 | 1.28 | 1.26 | 3.43 | 1.68 | 1.14 | 0.72 | 0.03 |

FIG. 6

| BO | | |
|---|---|---|
| VINTAGES | SD IRR | SD MM |
| 1980 | 4.38% | 5.67 |
| 1981 | 20.33% | 3.42 |
| 1982 | | |
| 1983 | 34.69% | 1.83 |
| 1984 | 28.64% | 2.68 |
| 1985 | 47.25% | 5.50 |
| 1986 | 17.90% | 2.54 |
| 1987 | 13.32% | 0.94 |
| 1988 | 7.95% | 0.97 |
| 1989 | 10.70% | 0.95 |
| 1990 | 11.42% | 0.93 |
| 1991 | 5.28% | 1.01 |
| 1992 | 13.98% | 1.07 |
| 1993 | 14.94% | 0.88 |
| 1994 | 14.64% | 0.85 |
| 1995 | 10.59% | 0.70 |

FIG. 7

| INDIVIDUAL FUND STATISTICS | | | | | | |
|---|---|---|---|---|---|---|
| | DEPTH | | | YEARS TO MIN BALANCE | | |
| TYPE/ VINTAGE | MEAN FOR VINTAGE | MEDIAN FOR VINTAGE | STANDARD DEV. FOR VINTAGE | MEAN FOR VINTAGE | MEDIAN FOR VINTAGE | STANDARD DEV. FOR VINTAGE |
| BO1980-3 | 81.9% | 92.7% | 24.0% | 2.7 | 2.0 | 2.3 |
| BO1984 | 81.0% | 89.1% | 21.5% | 2.6 | 1.5 | 2.5 |
| BO1985 | 69.9% | 75.0% | 32.4% | 2.4 | 2.0 | 1.8 |
| BO1986 | 78.9% | 79.7% | 21.2% | 2.4 | 2.2 | 1.6 |
| BO1987 | 72.7% | 74.9% | 21.9% | 3.5 | 3.0 | 2.3 |
| BO1988 | 70.9% | 74.4% | 17.6% | 3.1 | 3.0 | 1.6 |
| BO1989 | 71.2% | 75.0% | 23.8% | 3.5 | 3.3 | 2.1 |
| BO1990 | 70.6% | 77.5% | 24.8% | 2.9 | 3.2 | 1.8 |
| BO1991 | 55.7% | 48.9% | 23.8% | 3.7 | 4.2 | 1.9 |
| BO1992 | 64.2% | 67.2% | 24.4% | 3.4 | 3.2 | 1.5 |
| BO1993 | 64.7% | 69.3% | 21.7% | 2.6 | 2.7 | 1.4 |
| BO1994 | 61.8% | 63.5% | 20.3% | 2.9 | 2.7 | 1.7 |

FIG. 8

| REPORT DATE AS OF 12/31/2004 | | | | VENTURE CAPITAL FUNDS (ONLY) | | | | | |
|---|---|---|---|---|---|---|---|---|---|
| CALCULATION TYPE : IRR | | | PRIMARY MARKET : US | | | | | | |
| VINTAGE YEAR | NUM | AVG | CAP WTD AVG | POOLED AVG | MAX | UPPER | MED | LOWER | MIN |
| 1969-75 | 13 | 19.3 | 18.8 | 19.8 | 36.2 | 24.5 | 19.9 | 12.5 | 7.8 |
| 1976-79 | 17 | 31.5 | 30.4 | 29.3 | 74.1 | 45.7 | 34.3 | 14.3 | 3.6 |
| 1980 | 18 | 13.5 | 22.4 | 18.7 | 31.8 | 18.2 | 13.4 | 8.8 | -1.9 |
| 1981 | 21 | 7.8 | 10.3 | 10.9 | 25.4 | 13.6 | 9.7 | 0 | -3.3 |
| 1982 | 29 | 3.1 | 4.7 | 5.1 | 13.5 | 9.1 | 4.2 | 0 | -21.4 |
| 1983 | 59 | 6.4 | 7.5 | 8.3 | 41.5 | 10.1 | 5.2 | 1.2 | -11.4 |
| 1984 | 66 | 4.9 | 6 | 6.2 | 25.5 | 11.3 | 3.8 | 1 | -18.4 |
| 1985 | 46 | 7.3 | 8.6 | 9.8 | 28.3 | 15.1 | 8.4 | 2.2 | -41.5 |
| 1986 | 44 | 7.2 | 10 | 12.5 | 25.6 | 12.2 | 6.3 | 2.3 | -11.2 |
| 1987 | 66 | 7.3 | 12.4 | 13.8 | 31.5 | 17.1 | 7 | 0 | -37.8 |
| 1988 | 46 | 11.6 | 18.9 | 19 | 42.7 | 18.5 | 8.3 | 1.3 | -9 |
| 1989 | 55 | 12.1 | 17.2 | 18.3 | 56 | 17.3 | 10.5 | 1.7 | -35.9 |
| 1990 | 23 | 16.6 | 23.5 | 27.4 | 74.9 | 25.3 | 13.7 | -0.3 | -11 |
| 1991 | 18 | 18.6 | 28.4 | 31.2 | 61.4 | 25.7 | 18.6 | 4.4 | -0.9 |
| 1992 | 27 | 22.3 | 25.8 | 30.1 | 102.3 | 31.7 | 15.1 | 10.9 | -47.2 |
| 1993 | 40 | 23.6 | 32 | 44.2 | 116.4 | 39.8 | 12.4 | -0.4 | -25 |
| 1994 | 41 | 24.8 | 32.5 | 39.2 | 113 | 39.8 | 18.4 | 4.6 | -47.9 |

FIG. 9

| REPORT DATE AS OF 12/31/2004 | | | | VENTURE CAPITAL FUNDS (ONLY) | | | | | |
|---|---|---|---|---|---|---|---|---|---|
| CALCULATION TYPE : MM | | | | PRIMARY MARKET : US | | | | | |
| VINTAGE YEAR | NUM | AVG | CAP WTD AVG | POOLED AVG | MAX | UPPER | MED | LOWER | MIN |
| 1969-75 | 13 | 4.8 | 4.44 | 4.48 | 13.2 | 6.19 | 3.72 | 2.37 | 1.62 |
| 1976-79 | 17 | 3.47 | 3.33 | 3.28 | 7.59 | 4.32 | 3.04 | 2.17 | 0.68 |
| 1980 | 18 | 2.2 | 2.38 | 2.4 | 4.83 | 2.51 | 2.14 | 1.52 | 0.88 |
| 1981 | 21 | 1.6 | 1.85 | 1.88 | 3.95 | 2 | 1.5 | 0.96 | 0 |
| 1982 | 29 | 1.27 | 1.39 | 1.4 | 2.76 | 1.74 | 1.21 | 0.79 | 0.13 |
| 1983 | 59 | 1.58 | 1.77 | 1.75 | 4.54 | 2.13 | 1.42 | 0.86 | 0.06 |
| 1984 | 66 | 1.35 | 1.43 | 1.43 | 3.77 | 1.99 | 1.28 | 0.5 | 0 |
| 1985 | 46 | 1.82 | 1.92 | 1.92 | 4.11 | 2.89 | 1.69 | 0.99 | 0.02 |
| 1986 | 44 | 1.59 | 2.48 | 2.51 | 4.37 | 1.95 | 1.51 | 1.09 | 0 |
| 1987 | 66 | 1.81 | 2.21 | 2.19 | 6.76 | 2.62 | 1.43 | 0.46 | 0.05 |
| 1988 | 46 | 1.8 | 2.37 | 2.37 | 5.1 | 2.55 | 1.4 | 0.98 | 0.01 |
| 1989 | 55 | 1.82 | 2.3 | 2.3 | 6.13 | 2.27 | 1.53 | 0.99 | 0 |
| 1990 | 23 | 1.84 | 2.52 | 2.69 | 7.35 | 2.48 | 1.53 | 0.29 | 0 |
| 1991 | 18 | 1.95 | 2.59 | 2.77 | 5.53 | 2.81 | 1.85 | 0.97 | 0 |
| 1992 | 27 | 2.7 | 2.67 | 2.65 | 14.04 | 3.07 | 1.73 | 1.32 | 0 |
| 1993 | 40 | 2.81 | 3.56 | 3.73 | 27.82 | 2.88 | 1.15 | 0.48 | 0 |
| 1994 | 41 | 2.49 | 3.03 | 3 | 13.58 | 3.3 | 1.31 | 0.73 | 0 |

FIG. 10

| VENTURE |||
|---|---|---|
| VINTAGES | SD IRR | SD MM |
| 1980 | 4.15% | 0.81 |
| 1981 | 9.59% | 1.35 |
| 1982 | 8.03% | 1.06 |
| 1983 | 7.54% | 1.46 |
| 1984 | 8.70% | 1.25 |
| 1985 | 11.65% | 1.73 |
| 1986 | 8.48% | 2.88 |
| 1987 | 8.13% | 1.46 |
| 1988 | 7.53% | 0.94 |
| 1989 | 18.47% | 2.17 |
| 1990 | 20.67% | 5.08 |
| 1991 | 28.05% | 2.59 |
| 1992 | 35.71% | 4.74 |
| 1993 | 38.62% | 4.11 |
| 1994 | 46.67% | 1.89 |
| 1995 | 17.92% | 1.46 |

FIG. 11

| INDIVIDUAL FUND STATISTICS | | | | | | |
|---|---|---|---|---|---|---|
| | DEPTH | | | YEARS TO MIN BALANCE | | |
| TYPE/ VINTAGE | MEAN FOR VINTAGE | MEDIAN FOR VINTAGE | STANDARD DEV. FOR VINTAGE | MEAN FOR VINTAGE | MEDIAN FOR VINTAGE | STANDARD DEV. FOR VINTAGE |
| VC1980-3 | 85.6% | 97.9% | 22.4% | 2.5 | 2.1 | 1.6 |
| VC1984 | 88.8% | 98.0% | 18.0% | 2.9 | 2.8 | 1.7 |
| VC1985 | 86.6% | 97.8% | 21.1% | 2.9 | 2.5 | 3.1 |
| VC1986 | 88.0% | 94.1% | 15.7% | 3.4 | 3.0 | 2.1 |
| VC1987 | 84.6% | 93.4% | 21.0% | 3.7 | 3.6 | 2.3 |
| VC1988 | 77.8% | 82.7% | 22.2% | 4.0 | 4.2 | 1.8 |
| VC1989 | 78.5% | 84.5% | 18.3% | 4.1 | 4.2 | 1.9 |
| VC1990 | 69.6% | 74.6% | 22.7% | 4.1 | 4.1 | 2.1 |
| VC1991 | 72.9% | 74.4% | 20.3% | 4.2 | 3.8 | 2.9 |
| VC1992 | 78.8% | 81.0% | 17.8% | 3.2 | 3.4 | 1.2 |
| VC1993 | 67.9% | 71.0% | 23.4% | 3.4 | 3.0 | 1.6 |
| VC1994 | 71.8% | 75.8% | 20.2% | 3.4 | 3.2 | 1.6 |

FIG. 12

METHOD FOR ESTIMATING EXPECTED CASH FLOW OF AN INVESTMENT INSTRUMENT

FIELD OF THE INVENTION

This invention is in the field of predicting future performance of certain financial investments, such as investments in private equity funds. In a particular example, the invention relates to simulating past performance (e.g., net cash flow) of fully liquidated private equity funds based on statistics of the past performance and using the simulated past performance as an input for predicting future performance of non-fully-liquidated funds.

BACKGROUND

The present invention is described in the context of its application to analysis of private equity investment instruments, such as private equity funds. It will be appreciated by persons of ordinary skill in the art, however, that the methodology embodied in the present invention may be applicable to estimating expected cash flows from other investment instruments.

Private equity is the term used to describe a wide variety of investment strategies in companies that are not publicly traded. In most cases, private equity invests in companies that require capital to grow in excess of what their internally generated cash flow could achieve, but whose stage of development would not allow the companies to access the public debt or equity markets efficiently. Private equity investing also occurs when a disparity exists between the value ascribed by the market to a public company and the value that a private equity investor believes can be unlocked from the company if it were privately owned and managed. In this case, the investor attempts to buy the public shares of the company through a tender offer and de-list them, hoping to re-float the company at some future date at a greater value.

A private equity investment can take the form of debt, preferred equity, common equity, or any combination thereof, in a majority or a minority position, and represent an active or passive role in the management and direction of the company. As an asset class, private equity seeks to obtain high rates of return on invested capital as compared to the historical returns of the public markets. Private equity investors can invest in venture capital (VC) or private equity (PE) funds directly, or through a fund of funds structure. As the investments are identified at the underlying fund level the capital is called and the investments made.

The four stages of private equity investing are:

Own Capital and Friends & Family
Angel Investors
Venture Capital
Buyouts

The stages are represented graphically in FIG. 1, and a brief description of each of the stages of private equity as an asset class is given below. It is worth mentioning, however, that the categories of private equity are dynamic in nature and the differences between them are often blurred. This is caused by the opportunistic nature of private equity investing.

Own Capital and Friends & Family

An entrepreneur starting a company usually taps his own sources of capital to help it grow. Once these sources dry up, approaching friends and family for additional capital usually follows.

Angel Investors

Angel Investors are wealthy individuals who seek to invest in new companies that have limited resources or financial or operational history. Angel Investors provide capital, Knowlege, experience and contacts to help the company grow. In return, they get an equity stake in the company and aim for financial returns in excess of 50% per year upon an event of liquidity. An event of liquidity is commonly referred to as an event that allows the investor to sell shares. This typically occurs when the company lists its shares in a public stock exchange or is sold to a third party.

Venture Capital

Venture Capital (VC) seeks to invest in companies having significant growth potential or require expansion capital. Many VC firms are specialized by industry and employ trained professionals to identify attractive business opportunities. VC firms invest their capital and provide industry knowledge and expertise in exchange for equity in the company. Typically, VC firms precondition their capital investment to having certain managerial and operational controls. These include hiring and firing key members of the management team, approving annual budgets and financial statements. Additionally, VCs have significant board representation. The VC industry is well organized and established; it is comprised of hundreds of finds. VC investors typically seek returns in excess of 25% per year at liquidity.

Buyouts

Buyouts (BO) seek to invest in companies that are typically more mature than those a VC would be interested in. These companies usually have significant financial or operational history, are most times cash flow positive and have assets that can be leveraged. As a result, BO firms can sometimes borrow to make their acquisitions more financially attractive. Similar to VC, BO firms can be specialized by industry and also employ trained professionals to identify attractive business opportunities. BO firms also invest capital and provide industry knowledge and expertise in exchange for equity, and often acquire controlling positions to actively manage their investments and maximize returns. BO can be further categorized by investing types, including leveraged buyouts (LBOs) and mezzanine. Like VC, BO is well organized and established, and is comprised of hundreds of funds. BO investors typically seek returns in excess of 25% per year at liquidity.

The participants in Private Equity include investors, general partners (GP's), and entrepreneurs/companies.

Investors

Investors in private equity are called Limited Partners (LPs) and include institutional investors and several wealthy individuals looking for diversification of their portfolios with an asset class that seeks high rates of return. Some of the largest investors in Private Equity (buyout) include pension funds, (CalPERS, CalSTRS), insurance companies (AIG, Prudential, etc.), and banks (CSFB, Deutsche Bank, etc.).

General Partners

General Partners (GP's) are the managers of the fund's assets. Their job is to seek, identify, and screen private equity investments. Additionally, they are expected to execute the investments on terms that are sufficiently attractive to ensure the fund's interests are protected and that a profitable exit through a successful liquidity event can be achieved.

Some of the best-known general partners in the VC segment include Kleiner, Perkins, Caufield & Byers, and Sequoia Capital. In the Private Equity (buyout) segment, some well-known names include Kohlberg, Kravis & Roberts, and Hicks, Muse Tate & Furst.

Entrepreneurs/Companies

Private equity identifies and provides capital to entrepreneurs and companies that show promise. As a result, it plays an important role in the development of a country's economy. Those countries with well-developed private equity industries, such as the US and the UK, are much more innovative and generally more dynamic than their counterparts.

Private equity also increases liquidity in the marketplace. As a result, risk can be transferred to those parties who are more willing to bear it without undue cost, making the economy more fluid and efficient.

Cashflow Patterns—J-Curves

Investments in private equity funds take the form of interests in the limited partnerships. Typically, that is represented in a commitment to invest a predetermined amount of cash over a certain time period.

Over time, GPs call (or draws down) the committed capital from the LPs pro-rata to their respective commitment amount to pay for management fees and, more importantly, to make investments or acquisitions in companies. GPs distribute capital (both return on capital and return of capital) back to the LPs when the companies in which they invested are sold. In the interim period between the investment and the distribution of cash, the GPs report the value of the investments on a quarterly basis. Unfortunately, the reported value for the underlying investments is not an accurate indicator of the actual value the investment would have if it were to be traded in the open market. As a result, the reported net asset value is largely ignored in analytics of expected private equity performance.

A typical private equity fund has a five-year draw down period and a five to seven year distribution period, both of which can be extended with consent from the LPs. In most funds, investments cannot be made after the drawdown period and the fund's life expires after the end of the distribution period. As a result, most funds are considered mature or fully liquidated after their 10-year anniversary.

The pattern followed by the cumulative drawdowns and distributions of cash into a fund over time is known as the fund's J-curve. An illustration of a typical J-curve is presented in FIG. 3, which is a plot of the data tabulated in FIG. 2. The year of inception of the private equity fund—and the corresponding J-curve—is referred to as the fund's vintage.

FIG. 2 shows a table for a hypothetical ten-year private equity fund. For each year of the fund's existence the incremental and cumulative drawdowns ("INC DD" and "CUMM DD") are listed, as are the incremental and cumulative distributions ("INC DIS" and "CUMM DIS"). The difference between the cumulative distribution and the cumulative drawdown is the net cash flow ("NCF"). The values are listed as a percentage of the committed capital. That is, for a hypothetical investor, who, for example, has committed $10,000 to the private equity funds, the numbers listed in Table 2 are a percentage of that $10,000 commitment.

At year 0 (i.e., at the inception of the fund) there are, as yet, no drawdowns or distributions, and the net cash flow is zero. In year 1 of the hypothetical fund, the LP is asked to make an incremental payment (i.e., drawdown) of 20% of the committed capital. From a cash flow perspective, a drawdown is considered negative cash flow, and thus the drawdown is represented as −20%. In the hypothetical private equity fund illustrated in FIG. 2, the incremental distribution for year 1 is 1% (represented as positive cash flow). Thus, for year 1 the cumulative drawdown is −20%, the cumulative distribution is 1%, and the difference, or net cash flow, is −19%.

In year 2, the LP is requested to make a further payment, or drawdown, of an additional, or incremental, 25%. Thus, the cumulative drawdown after two years for that LP is 45%, represented as −45% cash flow. No incremental distribution is made in year 2 and thus the cumulative incremental distribution remains at 1% leading to a net cash flow of −44%.

In year 3, the incremental drawdown is 15% leading to a cumulative drawdown of −60% cash flow. The incremental distribution is 3 leading to a cumulative distribution of 4% cash flow, and the net cash flow is −56% (i.e., 4%-60%). In year 4, the incremental drawdown is 20% leading to a cumulative drawdown of −80% cash flow. The incremental distribution is 15% leading to a cumulative distribution of 19%, and the net cash flow is −61%.

In year 5, the incremental drawdown is 20% leading to a cumulative drawdown of −100% cash flow. The incremental distribution is 35% leading to a cumulative distribution of 54% and a net cash flow of −46%.

For years 6-10, there are no further drawdowns as the limited partner has now paid out 100% of the committed capital. Thus, for years 6-10 the cumulative drawdown remains at −100%. In year 6, the incremental distribution is 25% leading to a cumulative distribution of 79% and a net cash flow of −21%. In year 7, the incremental distribution is 35% leading to a cumulative distribution of 114% and a net cash flow of 14%. In years 8, 9, and 10, the incremental distributions are 32%, 22%, and 0, respectively, leading to cumulative distribution of 145%, 168%, and 168%, respectively, and net cash flows of 46%, 68%, and 68%.

FIG. 3 is a plot, i.e., the J-curve, of the net cash flow time series over the life of the private equity fund. The data points shown in FIG. 3 are those tabulated in FIG. 2.

Four important parameters of a J-curve include:

Money Multiple—is equal to total distributions divided by total contributions of capital. It is a measure of how profitably the capital has been invested from an absolute return perspective, without regard to the timing of the drawdowns or distributions. In the hypothetical private equity fund illustrated in FIGS. 2 and 3, the money multiple (MM) is 168/100=1.68

Internal Rate of Return—is the discount rate at which the present value of the draw downs equals the present value of the distribution. It is a measure of how profitably the capital has been invested from a temporal perspective without regard to the absolute returns achieved. Stated another way, in the context of the fund illustrated in FIGS. 2 and 3, what interest rate (i.e., internal rate of return) commencing at inception of the fund would pay 168% return on investment at the end of 10 years?

Speed of Draw—equals the number of periods for the J-curve to achieve its lowest point. It measures the relative speed at which the capital was drawn. In the fund illustrated in FIG. 3, the speed of draw is 4 periods.

Depth of Curve—equals the lowest point in the J-curve relative to the total amount of capital committed. It measures the relative amount of capital drawn before LPs began to receive distributions from their investments on a net basis (i.e. the investor may have received distributions in prior periods and may continue to be committed to make capital investments, but the investor will begin receiving a cumulative net amount of money greater than the capital that they need to invest from that point forward). In the fund illustrated in FIG. 3, the depth of fund is −61%.

When many funds are aggregated in an investment vehicle in what is known as a fund-of-funds structure, significant diversification can be achieved. Some of the most important parameters that can be diversified with a fund of funds structure include:

| Operational diversification | J-curve diversification |
| --- | --- |
| Type of fund | Money multiple |
| Geography | Internal rate of return |
| Industry | Speed of draw |
| Fund's vintage | Depth of curve |
| Manager | |

This diversification can be represented in J-curves as shown in FIG. 4.

As the example above illustrates, the depth of the J-curve is more favorable in the J-curve created from the cumulative net cash flows of each of the funds than in any of the individual J-curves.

Historical J-Curves and Cash Flow Modeling

The expected cash from a pool of private equity funds can be estimated by sampling individual J-curves of fully-liquidated vintages that have the same characteristics—such as, type of fund (e.g., buy-out or venture capital) and geographical focus (e.g., United States or Europe)—as each of the individual funds in the pool. The platform for making such estimations is known as a "private equity calculator." The private equity calculator can be used in a variety of ways, including: securitizations (either a static or managed leveraged positions in a portfolio of hedge funds), regulatory risk capital assessments (optimization of the level of risk capital reserves required to maintain an investment in a pool of private equity funds); balance sheet risk management (identifying the volatility of the asset performance, and the timing and size of the contributions and distributions of cash); and investment management purposes (expected cash-on-cash performance or capital allocation optimization).

In the past, such estimations could be performed using complete J-curve data for available past vintages. For example, the net cash flow over the life of a private equity buy-out fund initiated in 2005 can be predicted by analyzing a number of the historical net cash flows (i.e., J-curves) for similar buy-out funds of fully liquidated vintages (e.g., 1980-1995). Such data had historically been provided by companies that provide reports and analysis regarding fund performance in the private equity industry, such as Venture Economics, a company owned by Thompson Financial. Recently however, for reasons relating to confidentiality of the various funds' data, complete J-curve data is no longer made available to the public. While the complete J-curve data is no longer available, statistics for the J-curves of different vintages are still made available. These statistics include: mean, median, and standard deviation statistics for of each of the four parameters that compose a J-curve (money multiple, internal rate of return, speed of draw, and depth of curve). Also, aggregate J-curve data for all similar funds (e.g., buy-out or venture capital) is available for each fully liquidated vintage year.

But, having only aggregate J-curve data and statistics for past vintage years is not sufficient for making predictions of future net cash flows for other funds. Accordingly, a need exists to provide equity fund cash flow estimates by simulating the J-curve data that is no longer publicly available.

SUMMARY OF THE INVENTION

The present invention embodies a methodology in which future cash flows of an investment instrument (or portfolio of investment instruments) are estimated by (1) simulating past performance (i.e., cash flows) of similar instruments based on actual data of past performance, (2) using the simulated past performance to generate a distribution of possible future performance outcomes of the investment instrument, and (3) applying known probability and statistics methods (e.g., Monte Carlo methods) to assign probabilities to different possible future outcomes.

More specifically, aspects of the present invention are embodied in a method for simulating a net cash flow time series of an investment instrument in which the net cash flow time series is characterized by characterizing parameters. The method includes obtaining aggregate net cash flow time series data comprising the aggregated net cash flow time series data of a plurality of investment instruments. Statistics of the characterizing parameters of the net cash flow time series data of the plurality of investment instruments are obtained. A new net cash flow time series is generated by multiplying at least a portion of the aggregate net cash flow time series data by one or more scalar coefficients. And the scalar coefficients are calculated such that the characterizing parameters of the new net cash flow time series are statistically consistent with the statistics of the four characterizing parameters of the net cash flow time series data of the plurality of investment instruments.

In accordance with an exemplary embodiment the present invention, simulated J-curves are generated for various vintages and private equity fund types using the mean, median, and standard deviation statistics available for vintage years 1980 through 1995 for of each of the four parameters that compose a J-curve (money multiple, internal rate of return, speed of draw and depth of curve) in a stochastic Monte Carlo process.

The simulated J-curves generated in accordance with the methodology of the present invention are used as inputs in a cash flow model which is used for a variety of applications, including ratings and risk assessment.

Other aspects of the claimed invention will be appreciated upon reading the following detailed description and the appended claims.

BRIEF DESCRIPTION OF THE DRAWINGS

FIG. 2 is a tabulation of net cash flow data for a hypothetical private equity fund.

FIG. 5 is a table of internal rate of return ("IRR") statistics for a number of buyout funds for each of the vintage years 1980 to 1994.

FIG. 6 is a table of money multiple ("MM") statistics for a number of buyout funds for each of the vintage years 1980 to 1994.

FIG. 7 is a table of the standard deviations of the internal rate of return and the money multiple for the buyout funds for each of the vintage years 1980 to 1995.

FIG. 8 is a table of depth and speed to depth (i.e., years to minimum balance) statistics for the buyout funds for each of the vintage years 1980 to 1994.

FIG. 9 is a table of IRR statistics for a number of venture capital funds for each of the vintage years 1980 to 1994 (as well as 1969-75 and 1976-79).

FIG. 10 is a table of money multiple ("MM") statistics for a number of venture capital funds for each of the vintage years 1980 to 1994 (as well as 1969-75 and 1976-79).

FIG. 11 is a table of the standard deviations of the internal rate of return and the money multiple for the venture capital funds for each of the vintage years 1980 to 1995.

FIG. 12 is a table of depth and speed to depth (i.e., years to minimum balance) statistics for the venture capital funds for each of the vintage years 1980 to 1994.

DETAILED DESCRIPTION OF THE PREFERRED EMBODIMENT

Figure 1:
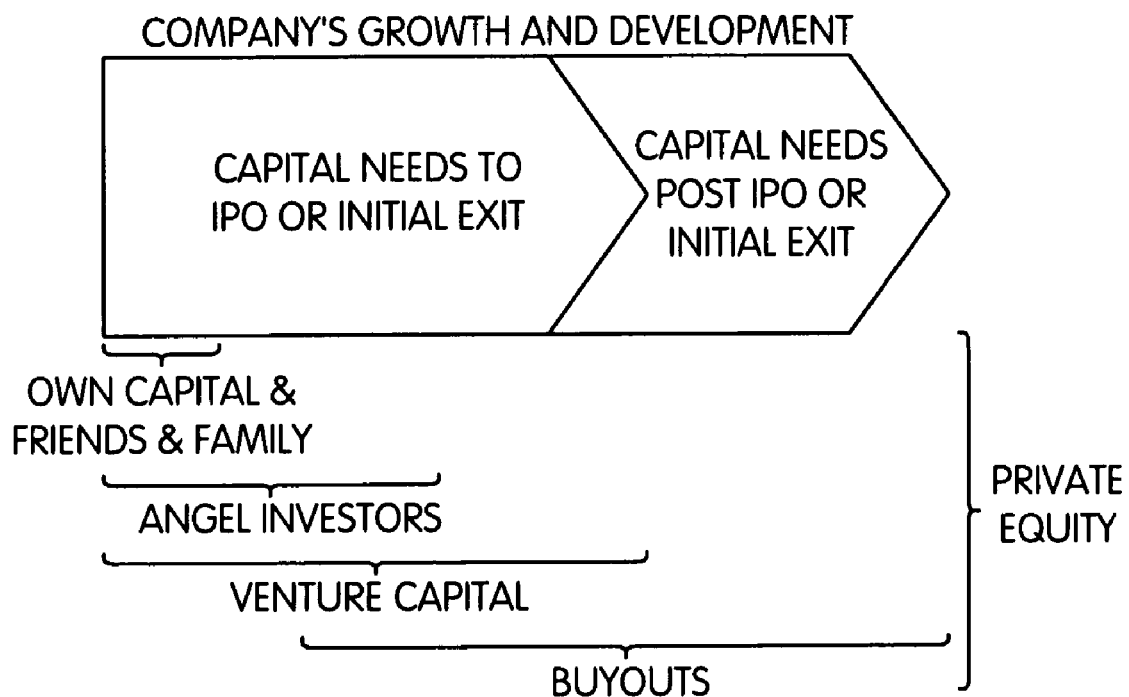
FIG. 1 is a graphical representation of the stages of private equity as an asset class.
Figure 3:
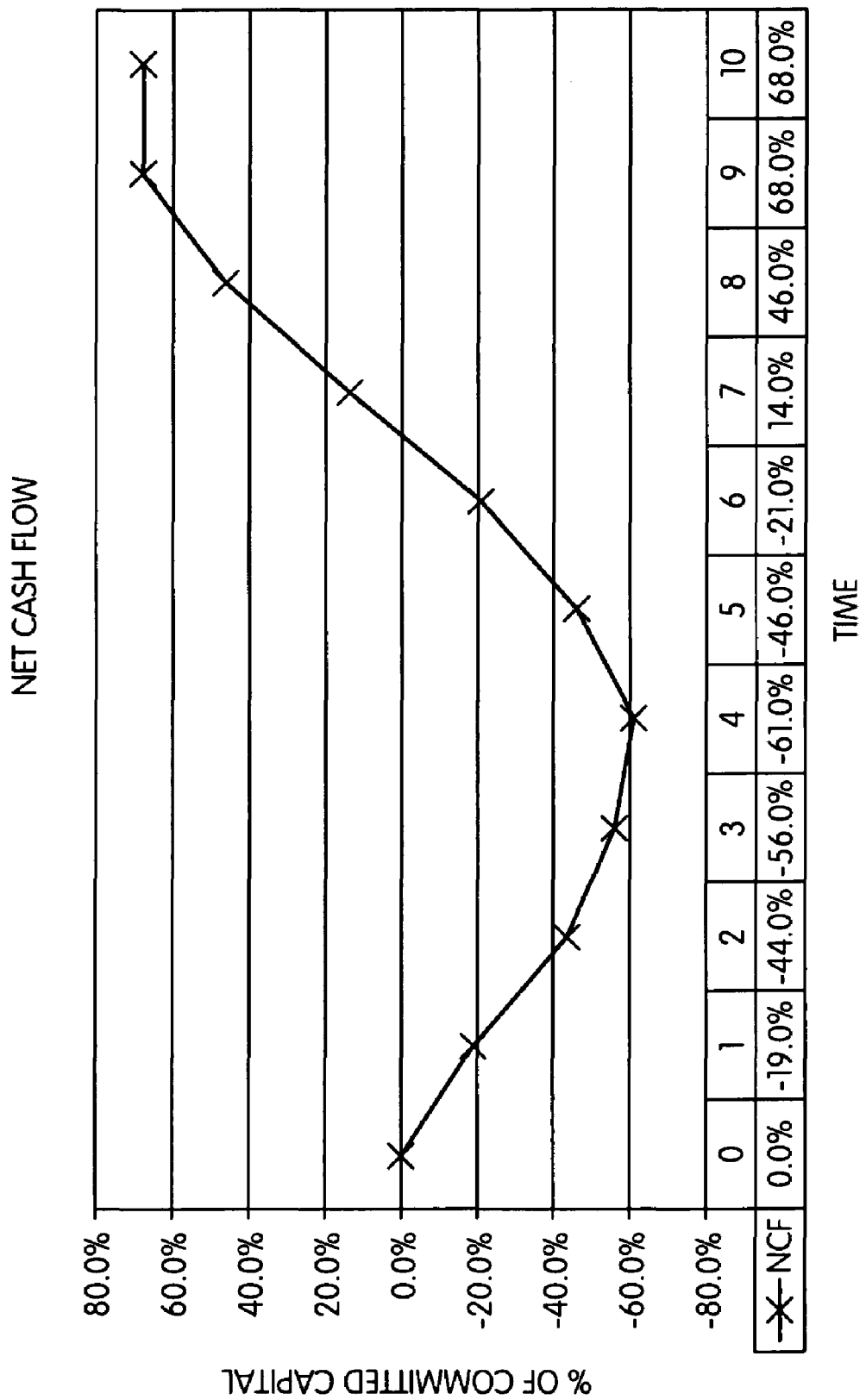
FIG. 3 is a plot—known as a J-curve—of the net cash flow tabulated in FIG. 2.
Figure 4:
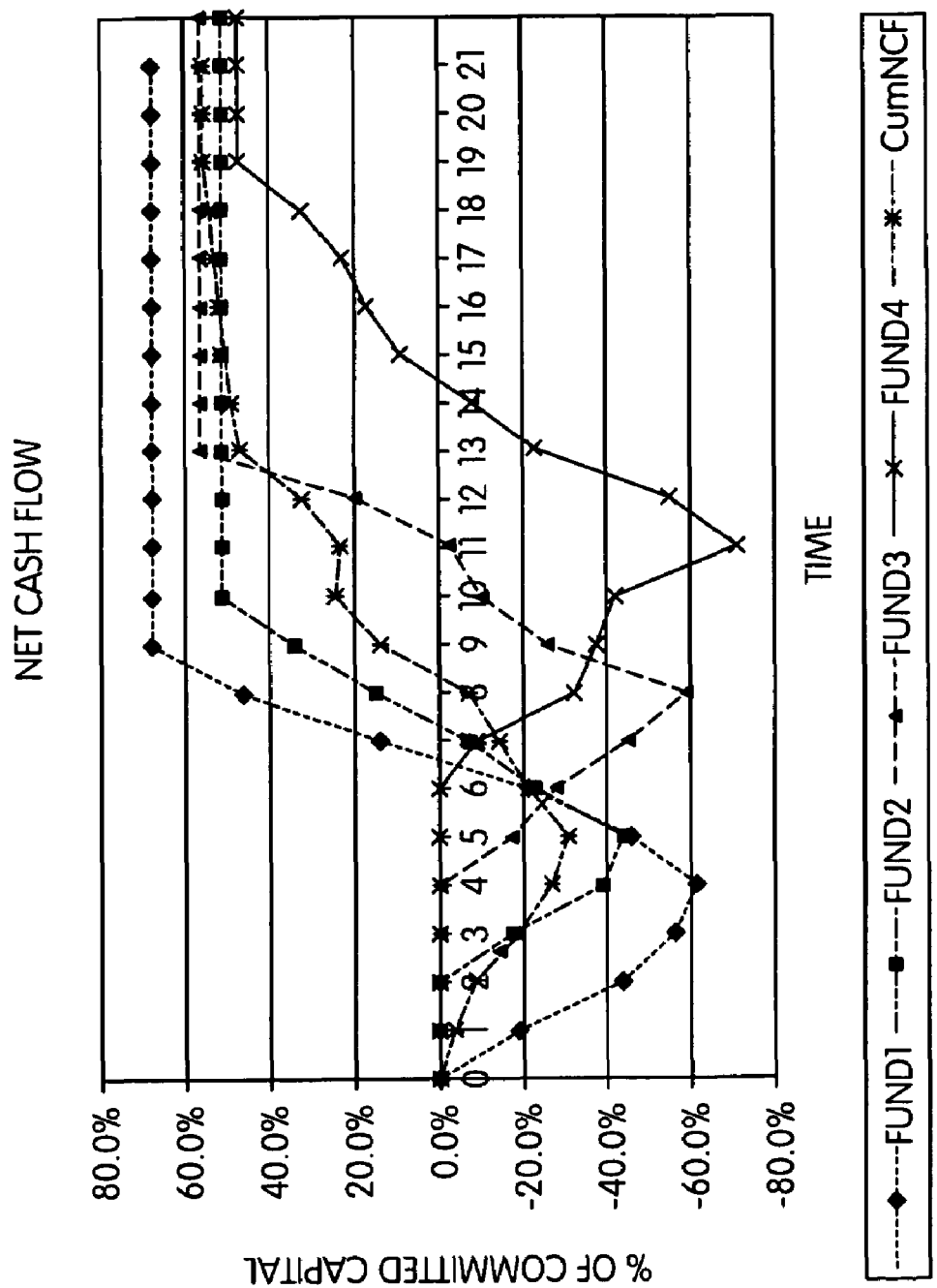
FIG. 4 is a plot of four hypothetical J-curves and an aggregate J-curve.

The present invention embodies a methodology for estimating (i.e., modeling) possible future cash flows of an investment instrument or a plurality (portfolio) of investment instruments. The inventions is described below in the context of an exemplary embodiment by which cash flows of private equity funds are modeled by simulating past private equity performance (J-curves for past, fully-liquidated vintage years and similar funds) and using the simulated past performance to model and estimate future performance. The description is not intended to be limiting to possible applications of the present invention, and persons of ordinary skill in the art will recognize other applications for which the present invention may be used.

The creation of simulated J-curves in accordance with the present invention is described below. The algorithm used in the stochastic cash flow model is also described below. The algorithms described below involve computations that are often complex and repetitive. Moreover, the algorithms involve accessing, storing, and manipulating much data. Accordingly, it will be readily understood that the algorithms may be performed by an appropriately programmed computer microprocessor in conjunction with suitable and sufficient electronic storage media that is accessible by the microprocessor.

Creation of Simulated J-Curves Using Statistical Data for Vintage Curves

Current criteria for building a model for a private equity collateralized fund obligations ("CFO") combines a historical simulation of J-curves with a parametric simulation of a public market index that scales the J-curves' cash flows. The only J-curve information that is presently available for commercial private equity funds is the aggregate vintage year cash flows and statistics (average, maximum, top quartile (75%), median (50%), lower quartile (25%), and minimum) for internal rate of return and money multiples. In one embodiment of the invention, the aggregate vintage J-curve is the sum of all cash flows (distributions less draw downs)—expressed as a percentage of the sum of all committed capital—for all funds of the same type (e.g., buyout or venture capital funds) and geographical focus that commenced operations in the same year. This information is available for vintage years 1980 through 1993 and, in the future, may become available for years following 1993. The current methodology also employs the mean and standard deviation of the depth and speed to maximum depth as additional statistics for the historical J-curves.

Development of this methodology relies on the aggregate vintage cash flow time series (i.e., draw downs and distributions) and the mean and standard deviation for four parameters: depth, speed, internal rate of return, and money multiples.

Summary of the Approach:

The aggregate vintage year information is stored basically in two time series: cash drawdown and cash distribution, which aggregate into that vintage year's J-curve. The aggregate J-curve can be shocked in several ways (can be parallel shifted, tilted, twisted, etc). to derive different J-curves. In accordance with the present invention, we chose to scale the draw downs (prior to and post the quarter in which maximum depth is achieved) and distributions (post the quarter in which maximum depth is achieved), such that certain parameters of the J-curve change within that vintage year's range, as determined by statistics (e.g., mean and standard deviation) of the four parameters of all the individual J-curves that make up the aggregate J-curve for that vintage year. By scaling only, certain serial correlation features are preserved. Also, implicitly, the methodology creates a variation of the quarter in which the J-curve turns positive.

Description of the Methodology:

The methodology to shock the vintage average J-curves is derived from the analysis of the four J-curve parameters:
1) depth,
2) speed to maximum depth,
3) internal rate of return, and
4) money multiple.

The derivation of a set of equations for solving for scalars, or coefficients, for scaling the aggregate vintage J-curve is as follows. Assume the quarterly draw downs of the aggregate J-curve are: $c_1, \ldots, c_k, \ldots, c_n$. Here k is the quarter in which the maximum depth of the J-curve was achieved. In this case, k is not necessarily the quarter of maximum depth of the aggregate J-curve, but is a quarter randomly drawn from a distribution that is statistically consistent with the mean and standard deviation of the speeds of the funds for a given vintage year. Assume the quarterly distributions (with cash distributions) of the aggregate vintage J-curve are: $\overline{c_1}, \ldots, \overline{c_k}, \ldots, \overline{c_n}$. As before, k is the quarter in which the maximum depth of the J-curve was achieved.

To make the formalization of the math equations easier, we'll use the following shorthand notations for draw downs prior/post the quarter in which maximum depth is attained:

$$s_{1,k} = c_1 + \ldots + c_k$$

$$s_{k+1,n} = c_{k+1} + \ldots + c_n$$

That is, $s_{1,k}$ is the shorthand notation for the sum of all draw downs prior to the quarter in which maximum depth is attained, and $s_{k+1,n}$ is the shorthand notation for the sum of all draw downs subsequent to the quarter in which maximum depth is attained.

Similarly, for distributions:

$$\overline{s_{1,k}} = \overline{c_1} + \ldots + \overline{c_k}$$

$$\overline{s_{k+1,n}} = \overline{c_{k+1}} + \ldots + \overline{c_n}.$$

That is, $\overline{s_{1,k}}$ is the shorthand notation for the sum of all distributions prior to the quarter in which maximum depth is attained, and $\overline{s_{k+1,n}}$ is the shorthand notation for the sum of all distributions subsequent to the quarter in which maximum depth is attained.

If internal rate of return is r on an annual basis, the internal rate of return is employed in the following equation known to those of ordinary skill in the art:

$$(\overline{c_1}-c_1)e^{-r/4}+(\overline{c_2}-c_2)e^{-2*r/4}+\ldots+(\overline{c_k}-c_k)e^{-k*r/4}+\ldots+(\overline{c_n}-c_n)e^{-n*r/4}=0$$

Again, to simplify formalization of the mathematics we'll use the following shorthand notations:

$$p_{1,k}=c_1e^{-r/4}+\ldots+c_ke^{-k*r/4}$$

$$p_{k+1,n}=c_{k+1}e^{-(k+1)*r/4}+\ldots+c_ne^{-n*r/4}$$

$$\overline{p_{1,k}}=\overline{c_1}e^{-r/4}+\ldots+\overline{c_k}e^{-k*r/4}$$

$$\overline{p_{k+1,n}}=\overline{c_{k+1}}e^{-(k+1)r/4}+\ldots+\overline{c_n}e^{-n*r/4}$$

With the above notations, given a depth and a quarter in which the depth is achieved, the formulas for depth and money multiple ("MM") become:

$$-s_{1,k} + \overline{s_{1,k}} = \text{depth} \quad \quad 1)$$

$$MM^*(s_{1,k} + s_{k+1,n}) = \overline{s_{1,k}} + \overline{s_{k+1,n}} \quad \quad 2)$$

$$\overline{p_{1,k} + p_{k+1,n}} = p_{1,k} + p_{k+1,n} \quad \quad 3)$$

To shock the J-curves and generate additional, simulated J-curves, we chose to scale the original aggregate J-curves by three parameters: $\alpha, \alpha', \beta$. The draw downs prior to the maximum depth are scaled by $\alpha$, the draw downs after that maximum are scaled by $\alpha'$, and the distributions after maxima are scaled by $\beta$. The distributions prior to maxima are preferably not scaled. Thus, the equations become, for a given depth, speed, money multiple, and internal rate of return:

$$-\alpha^* s_{1,k} + \overline{s_{1,k}} = \text{depth} \quad \quad 1')$$

$$MM^*(\alpha^* s_{1,k} + \alpha'^* s_{k+1,n}) = \overline{s_{1,k}} + \overline{s_{k+1,n}} * \beta \quad \quad 2')$$

$$\overline{p_{1,k} + p_{k+1,n}} * \beta = \alpha^* p_{1,k} + \alpha'^* p_{k+1,n} \quad \quad 3')$$

The following constraints are imposed on the solutions:
1) to insure we achieve the depth in quarter k,
   a) before reaching the depth:

$$-\alpha^* c_1 + \overline{c_1} < \text{depth}$$

$$-\alpha^* c_1 - \alpha^* c_2 + \overline{c_1} + \overline{c_2} < \text{depth}$$

and so on . . .

$$-\alpha^* c_1 - \ldots - \alpha^* c_{k-1} + \overline{c_1} + \ldots + \overline{c_k} < \text{depth}$$

b) after reaching the depth:

$$\text{depth} - \alpha'^* c_{k+1} + \beta^* \overline{c_{k+1}} > \text{depth}$$

$$\text{depth} - \alpha'^* c_{k+1} - \alpha'^* c_{k+2} + \beta^* \overline{c_{k+1}} + \beta^* \overline{c_{k+2}} > \text{depth}$$

and so on . . .

$$\text{depth} - \alpha'^* c_{k+1} - \ldots - \alpha'^* c_n + \beta^* \overline{c_{k+1}} + \ldots + \beta^* \overline{c_n} > \text{depth}$$

2) the sum of drawdown has to be less than 100%, but greater than 85%

$$85\% < \alpha^* c_1 + \ldots + \alpha^* c_k + \alpha'^* c_{k+1} + \ldots + \alpha'^* c_n < 100\%$$

3) the above constraint is more a compatibility condition that constrains the choice of speed: the quarter that we impose as the one in which maximum is achieved has to be followed by quarter is which the distributions are non-zero. In addition it should be at most quarter six, not earlier.

For internal rate of returns and money multiples, we have statistics for each year, including the average internal rate of return and money multiple for all funds in that vintage year. For depth and speed, we relied on fund statistics per vintage year. We have the average and standard deviation and assumed the statistical parameters for depth and speed follow a normal distribution.

Sample statistical data for each of the four parameters for vintage years 1980-1994 is shown in FIGS. 5-12. The data shown in FIGS. 5-8 are statistics for vintage buy-out funds, and the data shown in FIGS. 9-12 are statistics for vintage venture capital funds. More specifically, FIG. 5 is a table of internal rate of return ("IRR") statistics for a number of buy-out funds for each of the vintage years 1980 to 1994. Starting from the left-hand column, the first column is the vintage year, the second column is the number of funds from which the statistics were calculated (i.e., the number of funds aggregated), the third column is the average IRR for those funds for that vintage year, the fourth column is the capital weighted average IRR (i.e., where each fund's contribution to the average is weighted by the size of the fund) for those funds for that vintage year, the fifth column is the pooled average IRR (i.e., the average of all the funds within the vintage combined as if a single composite fund) for those funds for that vintage year, the sixth column is the maximum IRR of the funds for that vintage year, the seventh column is the upper percentile IRR (75%) of the funds for that vintage year, the eighth column is the median IRR (50%) of the funds for that vintage year, the ninth column is the lower percentile IRR (25%) of the funds for that vintage year, and the tenth column is the minimum IRR of the funds for that vintage year.

FIG. 6 is a table of money multiple ("MM") statistics for a number of buyout funds for each of the vintage years 1980 to 1994. Starting from the left-hand column, the first column is the vintage year, the second column is the number of funds from which the statistics were calculated (i.e., the number of funds aggregated), the third column is the average MM for those funds for that vintage year, the fourth column is the capital weighted average (defined above) MM for those funds for that vintage year, the fifth column is the pooled average (defined above) MM for those funds for that vintage year, the sixth column is the maximum MM of the funds for that vintage year, the seventh column is the upper percentile MM (75%) of the funds for that vintage year, the eighth column is the median MM (50%) of the funds for that vintage year, the ninth column is the lower percentile MM (25%) of the funds for that vintage year, and the tenth column is the minimum MM of the funds for that vintage year.

FIG. 7 is a table of the standard deviations of the internal rate of return and the money multiple for the buyout funds for each of the vintage years 1980 to 1995.

FIG. 8 is a table of the means, medians, and standard deviations of the depth and speed to depth (i.e., years to minimum balance) for the buyout funds for each of the vintage years 1980 to 1994.

FIG. 9 is a table of IRR statistics for a number of venture capital funds for each of the vintage years 1980 to 1994 (as well as 1969-75 and 1976-79). Starting from the left-hand column, the first column is the vintage year, the second column is the number of funds from which the statistics were calculated (i.e., the number of funds aggregated), the third column is the average IRR for those funds for that vintage year, the fourth column is the capital weighted average (defined above) IRR for those funds for that vintage year, the fifth column is the pooled average (defined above) IRR for those funds for that vintage year, the sixth column is the maximum IRR of the funds for that vintage year, the seventh column is the upper percentile IRR (75%) of the funds for that vintage year, the eighth column is the median IRR (50%) of the funds for that vintage year, the ninth column is the lower percentile IRR (25%) of the funds for that vintage year, and the tenth column is the minimum IRR of the funds for that vintage year.

FIG. 10 is a table of money multiple ("MM")statistics for a number of venture capital funds for each of the vintage years 1980 to 1994 (as well as 1969-75 and 1976-79). Starting from the left-hand column, the first column is the vintage year, the second column is the number of funds from which the statistics were calculated (i.e., the number of funds aggregated), the third column is the average MM for those funds for that vintage year, the fourth column is the capital weighted average (defined above) MM for those funds for that vintage year, the fifth column is the pooled average (defined above) MM for those funds for that vintage year, the sixth column is the maximum MM of the funds for that vintage year, the seventh column is the upper percentile MM (75%) of the funds for that vintage year, the eighth column is the median MM (50%) of the funds for that vintage year, the ninth column is the lower percentile MM (25%) of the funds for that vintage year, and the tenth column is the minimum MM of the funds for that vintage year.

FIG. 11 is a table of the standard deviations of the internal rate of return and the money multiple for the venture capital funds for each of the vintage years 1980 to 1995.

FIG. 12 is a table of the means, medians, and standard deviations of the depth and speed to depth (i.e., years to minimum balance) for the venture capital funds for each of the vintage years 1980 to 1994.

For speed, given the fact that the data is quarterly, and using a normal distribution with the above mean and standard deviation, random quarters were drawn for the maximum depth. Since speed must be expressed as an integer, i.e., an integer number of quarters to maximum depth, randomly drawn speeds that are non-integer are rounded up or down. Also, is it highly unusual for a J-curve to reach its maximum depth relatively early in the life of the fund. Thus, randomly drawn speeds that are below a certain number, preferably six, are not used.

The approach is applied separately to buy-out fund data and to venture capital fund data to generate a plurality of simulated buy-out fund curves (preferably at least 500) and a plurality of simulated venture capital fund curves (preferably at least 500) for each vintage year starting with 1980—or the earliest year for which data is available—and ending with 1994—or the latest year for which data is available.

The following steps are involved in the algorithm for generating the simulated J-curves:

1) Pick the vintage year and the aggregate time series.
2) Select a depth from a normal distribution having the statistical mean and standard deviation for the depth parameter for that vintage year (e.g., as in FIG. 8 or 12), and incorporate the selected value as depth into equation 1'.
3) Select a speed to minimum from a normal distribution having the statistical mean and standard deviation for the speed parameter for that vintage year (e.g., as in FIG. 8 or 12), and incorporate the selected value as k into equations 1', 2', and 3'.
4) Select an internal rate of return from a normal distribution having the statistical mean and standard deviation for the internal rate of return parameter for that vintage year (e.g., as in FIGS. 5, 7, 9, and 11), and incorporate the selected value as r which will be incorporated in the calculation of the $\overline{p_{1,k}}$, $\overline{p_{k+1,n}}$, $p_{1,k}$, $p_{k+1,n}$ (i.e., for equation 3').
5) Select a money multiple from a normal distribution having the statistical mean and standard deviation for the money multiple parameter for that vintage year (e.g., as in FIGS. 6, 7, 10, and 11), and incorporate the selected value as mm in equation 2'.
6) Solve for $\alpha$, $\alpha'$, $\beta$ the following system of equations:

$$-\alpha * s_{1,k} + \overline{s_{1,k}} = \text{depth} \quad 1')$$

$$mm*(\alpha * s_{1,k} + \alpha' * s_{k+1,n}) = \overline{s_{1,k}} + \overline{s_{k+1,n}} * \beta \quad 2')$$

$$\overline{p_{1,k}} + \overline{p_{k+1,n}} * \beta = \alpha * p_{1,k} + \alpha' * p_{k+1,n} \quad 3')$$

Notice the system has three unknowns and three equations. In addition, we have a series of constraints, and any solution is disregarded if the constraints are not met.

7) Apply the scalars $\alpha$, $\alpha'$ to the aggregate drawdown time series (prior and post reaching the maximum depth, respectively).
8) Apply the scalar $\beta$ to the aggregate distribution time series post reaching the maximum depth.

The algorithm throws out the curves that do not fall within the statistical parameters of the aggregate J-curves and/or violate one of the constraints imposed on the system of equations 1', 2', 3'. We draw, or select, independently a number of speeds, a number of internal rates of return, a number of money multiples, and a number of depths, and insert the drawn parameters into the system of equations and solve the system for $\alpha$, $\alpha'$ and $\beta$. Preferably, 50 speeds, 50 internal rates of return, 50 money multiples, and 50 depths are independently drawn.

Out of the J-curves created, we choose 500 curves, all equally likely (because they are based on actual statistics of the pool of J-curves). To insure enough dispersion, we draw approximately 250 curves that have a money multiple lower than the median and approximately 250 from the curves with a higher money multiple. Additionally, the draw proves that approximately half of the curves have an internal rate of return lower than the median. The pool for each vintage year is hence a balanced pool, which spans the range of variation of the parameters below and above the median.

The simulation is repeated for each vintage year from 1980-1993 (or for the vintage years for which data is available). By scaling only the base aggregate curve, we preserve temporal correlation of the aggregate vintage year prior to maximum depth and post maximum depth.

Algorithm for Stochastic Cash Flow Model and for modeling a portfolio of primary funds. The private equity calculator is implemented as follows using the simulated J-curve data generated in the manner described above.

For modeling cash flow, the following assumptions are made:

All funds start in current year (e.g., 2006).

Step one. Simulate a path (i.e., cash flow) of S&P 500 and one path of Nasdaq using the Garch model. The simulation should project each path out to the longest rated note or out to the relevant tenor of the exercise using monthly time steps.

Step two. Simulate a path for the interest rate and foreign exchange (if necessary for converting non-dollar private equity funds), using monthly time steps out to the longest rated note.

Step three. Draw a uniform distribution to randomly pick a year from the pool of available vintage years that have simulated, fully liquidated J-curves (e.g. 1985). The rationale of a historical simulation is based on the assumption that today the market will react and evolve as if we were in 1985 (or whatever year is randomly selected). The assumption is reasonable because the simulation will be repeated thousands of times (preferably at least 100,000) in a Monte Carlo fashion (where the future year is dependent on the characteristics of the portfolio simulated, and the historical year on which the simulation is based is chosen at random from the pool of years from which information exists). Thus, the assumption that any one future year will resemble any single historical year is reasonable. So, we place the portfolio in year 1985 and subject it to the market noise corresponding to that specific year. Each simulation path (cash flow) will randomly select a year from within the pool, (e.g., 1980, 1981, 1982, 1983, 1984, 1985, 1986, . . . , 1994).

Step four. To reduce the vintage year's over-performance to the expected performance of the public markets (i.e., returns that exceed those of the public market for the same period), calculate two theta scalars for the 1985 vintage: one for Buy-Out data ("BO") and one for Venture Capital data ("VC") as shown in the criteria ($\theta^{BO}_{1985}$, $\theta^{VC}_{1985}$). (See Appendix 1 below) The scalars are applied to the cash flow of all funds in a particular vintage year so the aggregate vintage year performance equals that of the public markets for that year. The scalars reflect an adjustment at the aggregate vintage year level and not at the fund level in that year. As a result, there will be one pair of thetas per vintage year and path simulated (one theta for BO and one theta for VC).

Applying the theta scalars to reduce the possible over-performance of a vintage year is optional. Historically, private equity does out-perform the public markets, and thus, over-performance of a vintage year as compared to the public markets does not necessarily reflect an unrealistic scenario. On the other hand, for the purpose of providing conservative performance estimates, it is at times preferable to artificially limit the performance estimates of private equity funds so that they do not out-perform the public markets, even though such limitations do not necessarily reflect reality.

Step five. Build a randomly selected portfolio using the investment guidelines (e.g., number of funds, type—BO or VC, commitment size, and currency exposure for each fund) as inputs. This is for evaluating hypothetical portfolios. Of course, if an actual portfolio is being evaluated, the inputs can be provided by the actual funds in the portfolio.

Step five-a. Draw, or select, uniformly from the simulated J-curves that belong to the 1985 BO funds (so each fund has an equal chance of being picked) and pick one J-curve for each BO fund that belongs to the portfolio. The J-curve pattern drawn is applied to the relevant fund commitment amount to create a cash-in/cash-out time series (i.e., J-curve) for each fund. That is, the simulated J-curve is presented as net cash flow (as a percentage of total cash commitment) versus time (e.g., quarters). The net cash flow of the J-curve for each time point is multiplied by the actual cash commitment of the relevant fund to derive a net cash flow (expressed, for example, in actual dollars or other currency) versus time.

Step five-b. Draw—i.e., select—uniformly from the J-curves that belong to the 1985 VC funds (so each fund has an equal chances of being picked) and pick one J-curve for each VC fund that belongs to the portfolio. The J-curve pattern is applied to the relevant fund commitment amount to create a cash-in/cash-out time series (i.e., J-curve) for each fund.

Step six. Take the cash-in/cash-out J-curves for each fund and adjust them by the corresponding theta scalars computed in step 4 above. Again, this step is optional, but is preferred if a conservative performance estimate is desired. Next, if appropriate, adjust each of the cash-in/cash-out J-curves projected by the simulated foreign exchange path.

Step seven. If the transaction requires distinguishing what is return ON capital and OF capital (if equity distributions are expected, or reinvestment of profit allowed), each fund has to be decomposed into proxy constituents.

Step eight. Aggregate the projected cash flow for each fund.

Step nine. Incorporate the priority of payments for all constituencies in the transaction.

Step ten. Determine if the transaction meets the obligations of the rated notes in each time step, enabling any structural features of the transaction to interact with the modeling exercise (e.g. liquidity facility for shortfalls, etc).

Step eleven. Go back to step one and construct a new path. Repeat the process multiple times, preferably 100,000 times. Based on the multiple iterations, a range of possible net cash flow outcomes is generated. Based on that range and the frequencies of specific outcomes, it becomes possible, using well-known probability and statistics techniques, such as Monte Carlo techniques, to assign probabilities to different outcomes. For example, one might assign for a proposed private equity portfolio a probability of 10% that an investor will lose 20% (net loss) of committed capital over 10 years, a probability of 20% that the investor will break even, a probability of 30% that the investor will see a return of 20% (net gain), a probability of 20% that the investor will see a return of 30% (net gain), a probability of 15% that the investor will see a return of 40% (net gain), and a probability of 5% that the investor will see a return of 50% (net gain) or more. Furthermore, the simulation results define a range of likely outcomes. In the example describe above the likely outcome ranges from 20% loss to 50% gain. Of course outcomes and performance can never be guaranteed, but an analysis such as this can inform an investor of possible cash flows and the likelihood of them, and from this useful information, an investor can make informed investment choices.

Depending on the deal specifications, some classes of notes may be repaid prior to their legal final maturity. That will depend on a variety of factors, including whether the transaction is allowed to reinvest or the expected use of the proceeds after any reinvestment priod hence, each of the 100,000 paths will have, potentially, a different tenor for each class of rated notes.

Step twelve. To determine the appropriate tenor (i.e., maturity of the financial instrument) used in calculating whether or not each class passes its requested rating level, the 100,000 tenors are aggregated to compute an average tenor for each class. The ratio of failed paths to total paths run is calculated for each class of rated notes. A failed path is one in which the transaction is not able to meet the obligations of the class of rated notes tested according to their terms. The frequency of failed to total paths has to be lower than the default probability of a corporate bond with that same rating as what is requested for each class using the same tenor as the average tenor computed.

Step thirteen. Repeat the tenor and frequency to failed paths threshold analysis for each of the classes of rated notes.

Algorithm for modeling a portfolio of primary funds with ramp-up period—adjustments to the methodology.

Assumptions:

The investment guidelines indicate the transaction will commit to funds with vintage years 2005, 2006, and 2007 over a 3-year ramp-up period. The investment guidelines outline the number, commitment size, type of funds (BO vs. VC), and geographic diversification that the transaction is expected to enter into over the three-year ramp-up period.

Modifications needed:

Start the simulation by performing steps:

Step A. Repeat Steps one and two above.

Step B. As in Step three above, a random year (e.g., 1985) is chosen as a base year, which will equate to the current year (2005). However, the 3-year ramp-up period implies the portfolio will have funds from 3 consecutive vintage years (e.g. 1985, 1986 and 1987). The pool of liquidated funds is assumed to follow a circular pattern, so vintage year 1994 is followed by vintage year 1980.

Step C. As in Step four above, one pair of theta scalars (one for BO and one for VC) will be needed for each vintage year. As a result, 3 pair of theta scalars will be needed: one pair for 1985 vintage year ($\theta^{BO}_{1985}$, $\theta^{VC}_{1985}$), one pair for 1986 vintage year ($\theta^{BO}_{1986}$, $\theta^{VC}_{1986}$) and one pair for 1987 vintage year ($\theta^{BO}_{1987}$, $\theta^{VC}_{1987}$). The scalars reflect an adjustment at the aggregate vintage year level and not at the fund level for that vintage year. Again, as above, applying theta scalars is an optional measure of conservatism.

Step D. As in Step five above, a randomly selected portfolio of primaries will be created in accordance with the investment guidelines.

Step D-1. Draw uniformly from the simulated J-curves that belong to the 1985, 1986 and 1987 BO funds to pick one J-curve for each fund in accordance with the investment guidelines. Create a cash-in/cash-out time series (i.e., J-curve) for each fund by applying the J-curve pattern to each fund commitment amount.

Step D-2. Draw uniformly from the J-curves that belong to the 1985, 1986 and 1987 VC funds to pick one J-curve for each fund in accordance with the investment guidelines. Create a cash-in/cash-out time series (i.e., J-curve) for each fund by applying the J-curve pattern to each fund commitment amount.

Step E. Repeat Step six above adjusting each fund by the theta scalar that corresponds to the vintage year and type of fund to which it belongs as determined in Step C above.

Step F. Repeat Step seven above.

Step G. Repeat Step eight above, ensuring the aggregation of cash flow maintains the vintage-year temporal differences of the funds. As a result, the cash flow pattern of the 2006 vintage-year funds will begin one year after those of the 2005 vintage. The cash flow pattern for the 2007 vintage-year funds will begin two years after those of the 2005 vintage, and one year after those for 2006 vintage.

Step H. Repeat Step nine through eleven as above.

Algorithm for Modeling a Portfolio of Secondaries—Adjustments to the Methodology.

Assumptions:

The investment guidelines indicate the transaction will purchase in 2005 funds with vintage years 2002, 2003 and 2004. The investment guidelines outline the number, commitment size, type of funds (BO vs. VC), and geographic diversification of each of these funds.

Modifications Needed:

Start your simulation by performing the following steps:

Step I. Repeat Steps one and two above.

Step II. As in Step three above, a random year (e.g., 1985) is chosen as a base year, which will equate the current year (2005). However, the funds purchased belong to the 3 vintage years prior to the current year. As a result, the funds that will be sampled will belong to the three years prior to the base vintage year (e.g. 1982, 1983 and 1984). The pool of liquidated funds is assumed to follow a circular pattern, so vintage year 1980 is followed by vintage year 1994.

Step III. As in Step four above, one pair of theta scalars (one for BO and one for VC) will be needed for each vintage year. As a result, 3 pair of theta scalars will be needed: one pair for 1982 vintage year ($\theta^{BO}_{1982}$, $\theta^{VC}_{1982}$), one pair for 1983 vintage year ($\theta^{BO}_{1983}$, $\theta^{VC}_{1983}$) and one pair for 1984 vintage year ($\theta^{BO}_{1984}$, $\theta^{VC}_{1984}$). The scalars reflect an adjustment at the aggregate vintage year level and not at the fund level for that vintage year. Again, applying the theta scalars is optional.

Step IV. As in Step five above, a randomly selected portfolio of primaries will be created in accordance with the investment guidelines.

Step IV-A. Draw uniformly from the J-curves that belong to the 1982, 1983 and 1984 BO funds to pick one J-curve for each fund in accordance with the investment guidelines. Create a cash-in/cash-out time series (i.e., J-curve) for each fund by applying the J-curve pattern to each fund commitment amount.

Step IV-B. Draw uniformly from the J-curves that belong to the 1982, 1983 and 1984 VC funds to pick one J-curve for each fund in accordance with the investment guidelines. Create a cash-in cash-out time series (i.e., J-curve) for each fund by applying the J-curve pattern to each fund commitment amount.

Step V. Repeat Step six above adjusting each fund by the theta scalar that corresponds to the vintage year and type of fund to which it belongs as determined in Step III above.

Step VI. Adjust the cash-in/cash-out J-curves for each fund to reflect actual amounts drawn down and distributed for each secondary fund (see Appendix 2 below). The adjustment scales the J-curve to reflect the actual drawdown/distribution after year 3 for funds drawn from 1982, the actual drawdown/distribution after year 2 for funds drawn from 1983, the actual drawdown/distribution after year 1 for funds drawn from 1984.

Step VII. Repeat Step seven above.

Step VIII. Repeat Step eight above, ensuring the cash flow projection for each of the secondary funds begins in 2005 (equivalent to 1985 in each of the J-curves sampled). This implies the funds that belong to the 1982 (2002) vintage will ignore the cash flow that would correspond to the part of the J-curve from 1982 to 1985, the funds that belong to the 1983 (2003) vintage will ignore the cash flow that would correspond to the part of the J-curve from 1983 to 1985, and the funds that belong to the 1984 (2004) vintage will ignore the cash flow that would correspond to the part of the J-curve from 1984 to 1985. In this way, the life of each of the J-curves of the secondary funds is reduced to reflect the time lapsed between their inception and purchase, and the pattern of each of the sampled J-curves is modified (as per Appendix 2 indicated in Step VI above) to reflect the actual differences between their drawdown/distribution patterns and the secondary funds actually purchased. Finally, the price paid for each of the secondary funds should be treated as a drawdown in 2005 (time of purchase).

Step IX. Repeat Steps nine through eleven as above.

Appendix 1—Calculation of 'theta' Scalars:

Assume a 10-year-old vintage:

Let $c_1, c_2, \ldots, c_n$ be the monthly drawdowns for the lifetime of the vintage, Let $\overline{c_1}, \overline{c_2}, \ldots, \overline{c_n}$ be the monthly distributions for the lifetime of the vintage, Let $a_1, a_2, \ldots, a_n$ be the monthly public market index share price (e.g. S&P500 or Nasdaq), and Let $\theta$ be the scaling factor for the distributions.

$$\frac{c_1}{a_1} + \frac{c_2}{a_2} + \ldots + \frac{c_n}{a_n} = \theta\left(\frac{\overline{c_1}}{a_1} + \frac{\overline{c_2}}{a_2} + \ldots + \frac{\overline{c_n}}{a_n}\right)$$

The number of public equity market index shares that can be acquired by the drawdown cash flow is equated to the number of shares that need to be sold to create the distribution cash flow. Or equivalently, $$\frac{c_1 - \theta\overline{c_1}}{a_1} + \frac{c_2 - \theta\overline{c_2}}{a_2} + \ldots + \frac{c_n - \theta\overline{c_n}}{a_n} = 0$$

In all cases, $\theta$ (or Theta) is capped at 1.00

As long as the final value of the public market equivalent portfolio is equal to the final liquidation value of a private equity market vintage of zero, there is no superior risk-adjusted performance ascribed to private equity markets.

Appendix 2—Scale Private Equity Funds Purchased in the Secondary Market ("Secondaries"):

Assume a secondary fund m years old for which we know the past and current draw downs: $d_1, d_2, \ldots, d_k$ and distributions $\overline{d_1}, \overline{d_2}, \ldots, \overline{d_k}$, where k is the last month of reporting during the $m^{th}$ year of life. Let $c_1, c_2, \ldots, c_n$ be the monthly draw downs for the lifetime of the vintage corresponding to a base vintage randomly drawn for a m year old fund. Let $\overline{c_1}, \overline{c_2}, \ldots, \overline{c_n}$ be the monthly distributions for the lifetime of the same vintage.

We want to find v, v', w, w' such that the following conditions hold:

$$v(c_1+c_2+\ldots+c_k)=d_1+d_2+\ldots+d_k \qquad 1)$$

$$w(\overline{c_1}+\overline{c_2}+\ldots+\overline{c_k})=\overline{d_1}+\overline{d_2}+\ldots+\overline{d_k} \qquad 2)$$

$$v(c_1+c_2+\ldots+c_k)+v'(c_{k+1}+c_{k+2}+\ldots+c_n)=(c_1+c_2+\ldots+c_k)+(c_{k+1}+c_{k+2}+\ldots+c_n) \qquad 3)$$

$$w(\overline{c_1}+\overline{c_2}+\ldots+\overline{c_k})+w'(\overline{c_{k+1}}+\overline{c_{k+2}}+\ldots+\overline{c_n})=(\overline{c_1}+\overline{c_2}+\ldots+\overline{c_k})+(\overline{c_{k+1}}+\overline{c_{k+2}}+\ldots+\overline{c_n}) \qquad 4)$$

The first two constraints adjust the shape of a J-curve from its inception to the month for which historical information is available (e.g. period k in our simple example), so the total drawdown (or distribution) of the randomly selected fund equals that of the secondary up to the date of purchase. The last two constraints insure that the adjustment of the J-curve prior to month k, leave the total draw downs (and distributions) of the 10 year fund unchanged. Hence, the J-curve used for projecting the cash-in cash-out patterns for the remaining life of a secondary fund will be based on same total draw downs and total distributions as the fund sampled from the database of fully-liquidated funds. Implicitly these constraints will keep the ratio of total draw downs/total distributions the same as well.

From the above equations it is easy to compute:

$$v = \frac{\sum_{i \leq k} d_i}{\sum_{i \leq k} c_i} \text{ and } w = \frac{\sum_{i \leq k} \overline{d_i}}{\sum_{i \leq k} \overline{c_i}}.$$

The other two factors follow easily as well:

$$v' = \frac{\sum_i c_i - \sum_{i \leq k} d_i}{\sum_{i \geq k} c_i} \text{ and } w' = \frac{\sum_i \overline{c_i} - \sum_{i \leq k} \overline{d_i}}{\sum_{i \geq k} \overline{c_i}}$$

So, the shape of the J-curve is slightly modified to preserve its initial characteristics (total drawdown and total distribution) while reflecting the characteristics of the secondary fund being modeled.

Additionally, if $$\sum_{i \geq k} \overline{c_i} = 0,$$

assume $(\overline{c_1}+\overline{c_2}+\ldots+\overline{c_k})=\overline{d_1}+\overline{d_2}+\ldots+\overline{d_k}$ and that w=1.

While the invention has been described in connection with what are presently considered to be the most practical and preferred procedures and embodiments, it is to be understood that the invention is not to be limited to the disclosed procedures and embodiments, but, on the contrary, is intended to cover various modifications and equivalent arrangements included within the spirit and scope of the appended claims.

The invention claimed is:

1. A computer readable medium encoded with computer executable commands, which, when executed by a computer, cause the computer to estimate expected cash flow of an investment instrument, comprising commands to:

simulate a net cash flow time series of an investment instrument in which the net cash flow time series is comprised of a draw down time series and a distribution time series and the net cash flow time series is characterized by four characterizing parameters comprising money multiple ("MM"), internal rate of return ("IRR"), maximum depth ("depth"), and speed to maximum depth ("speed"), comprising commands to:

store in an electronic storage medium aggregate net cash flow time series data comprising the aggregated net cash flow time series data of a plurality of investment instruments;

store in the electronic storage medium statistics of the four characterizing parameters of the net cash flow time series data of the plurality of investment instruments;

transform the stored aggregate net cash flow time series data to generate a new net cash flow time series, by multiplying at least a portion of the aggregate net cash flow time series data by one or more scalar coefficients; and display or store said new net cash flow;

wherein the one or more scalar coefficients are calculated such that the four characterizing parameters of the new net cash flow time series are statistically consistent with the statistics of the four characterizing parameters of the net cash flow time series data of the plurality of investment instruments.

2. The computer readable medium encoded with computer executable commands of claim 1, wherein the commands to generate a new net cash flow time series further comprise commands to:

multiply a portion of the drawdown time series of the aggregate net cash flow time series by a first scalar coefficient;

multiply a different portion of the drawdown time series of the aggregate net cash flow time series by a second scalar coefficient; and multiply a portion of the distribution time series of the aggregate net cash flow time series by a third scalar coefficient.

3. The computer readable medium encoded with computer executable commands of claim 2, wherein, the portion of the drawdown time series of the aggregate net cash flow time series multiplied by the first scalar coefficient is the portion of the drawdown time series up to a period of maximum depth selected so as to be statistically consistent with statistics of the speed of the net cash flow time series data of the plurality of investment instruments;

the different portion of the drawdown time series of the aggregate net cash flow time series multiplied by the second scalar coefficient is the portion of the drawdown time series after the period of maximum depth selected so as to be statistically consistent with statistics of the speed of the net cash flow time series data of the plurality of investment instruments; and the portion of the distribution time series of the aggregate net cash flow time series multiplied by the third scalar coefficient is the portion of the distribution time series after the period of maximum depth selected so as to be statistically consistent with statistics of the speed of the net cash flow time series data of the plurality of investment instruments.

4. The computer readable medium encoded with computer executable commands of claim 3, wherein the first, second, and third scalar coefficients are obtain by solving a system of three equations involving the four characterizing parameters MM, IRR, depth, and speed, where the four characterizing parameters inserted into the system of three equations are values selected so as to be statistically consistent with the statistics of the four characterizing parameters of the net cash flow time series data of the plurality of investment instruments, and the first, second, and third scalar coefficients are the only unknowns of the system of three equations.

5. The computer readable medium encoded with computer executable commands of claim 3, wherein the scalar coefficients are calculated by solving the following system of equations:

$$-\alpha^* s_{1,k} + \overline{s_{1,k}} = \text{depth}$$

$$MM^*(\alpha^* s_{1,k} + \alpha'^* s_{k+1,n}) = \overline{s_{1,k}} + \overline{s_{k+1,n}}^* \beta$$

$$\overline{p_{1,k}} + \overline{p_{k+1,n}}^* \beta = \alpha^* p_{1,k} + \alpha'^* p_{k+1,n}$$

for $\alpha$, $\alpha'$, and $\beta$, and wherein:
$\alpha$ is the first scalar coefficient;
$\alpha'$ is the second scalar coefficient;
$\beta$ is the third scalar coefficient;
$s_{1,k} = c_1 + \ldots + c_k$;
$s_{k+1,n} = c_{k+1} + \ldots + c_n$;
$\overline{s_{1,k}} = \overline{c_1} + \ldots + \overline{c_k}$;
$\overline{s_{k+1,n}} = \overline{c_{k+1}} + \ldots + \overline{c_n}$;
$p_{1,k} = c_1 e^{-r/4} + \ldots + c_k e^{-k^* r/4}$;
$p_{k+1,n} = c_{k+1} e^{-(k+1)^* r/4} + \ldots + c_n e^{-n^* r/4}$;
$\overline{p_{1,k}} = \overline{c_1} e^{-r/4} + \ldots + \overline{c_k} e^{-k^* r/4}$;
$\overline{p_{k+1,n}} = \overline{c_{k+1}} e^{-(k+1) r/4} + \ldots + \overline{c_n} e^{-n^* r/4}$;

where $c_1, \ldots, c_k, \ldots, c_n$ represents the draw down time series of the aggregate net cash flow time series, $\overline{c_1}, \ldots, \overline{c_k}, \ldots, \overline{c_n}$ represents the distribution time series of the aggregate net cash flow time series, and k is the period of maximum depth selected so as to be statistically consistent with statistics of the speed of the net cash flow time series data of the plurality of investment instruments, depth is a depth selected so as to be statistically consistent with statistics of the depth of the net cash flow time series data of the plurality of investment instruments;

MM is an MM selected so as to be statistically consistent with statistics of the MM of the net cash flow time series data of the plurality of investment instruments; and r is an IRR selected so as to be statistically consistent with statistics of the IRR of the net cash flow time series data of the plurality of investment instruments.

6. The computer readable medium encoded with computer executable commands of claim 1, wherein the statistics of the four characterizing parameters comprise the average and the standard deviation of each of the MM and IRR of the net cash flow time series data of the plurality of investment instruments and the mean and standard deviation of each of the depth and speed of the net cash flow time series data of the plurality of investment instruments.

7. The computer readable medium encoded with computer executable commands of claim 1, wherein the investment instrument is a private equity fund.

8. The computer readable medium encoded with computer executable commands of claim 7, wherein the investment instrument is a buy-out or venture capital private equity fund.

9. The computer readable medium encoded with computer executable commands of claim 1, wherein the plurality of investment instruments comprise a plurality of private equity funds for a given vintage year.

10. A computer readable medium encoded with computer executable commands, which, when executed by the computer, cause a computer to estimate expected cash flow of an investment instrument, comprising commands to:

(A) simulate a net cash flow time series of an investment instrument in which the net cash flow time series is comprised of a draw down time series and a distribution time series and the net cash flow time series is characterized by four characterizing parameters comprising money multiple ("MM"), internal rate of return ("IRR"), maximum depth ("depth"), and speed to maximum depth ("speed"), said commands to simulate comprising commands to:

(1) store in an electronic storage medium aggregate net cash flow time series data comprising the aggregated net cash flow time series data of a plurality of investment instruments;

(2) store in the electronic storage medium statistics of the four characterizing parameters of the net cash flow time series data of the plurality of investment instruments; and (3) transform the stored aggregate net cash flow time series data to generate a new net cash flow time series, by multiplying at least a portion of the aggregate net cash flow time series data by one or more scalar coefficients;

wherein the one or more scalar coefficients are calculated such that the four characterizing parameters of the new net cash flow time series are statistically consistent with the statistics of the four characterizing parameters of the net cash flow time series data of the plurality of investment instruments;

(B) repeat execution of said commands to simulate a plurality of times to generate a plurality of new net cash flow time series;

(C) generate a plurality of potential cash flow time series for the investment instrument, each of the potential cash flow time series being modeled after one of the plurality of new net cash flow time series;

(D) estimate expected cash flow from the plurality of potential cash flow time series; and (E) store expected cash flow in one of the media.

11. The computer readable medium encoded with computer executable commands of claim 10, wherein the commands to estimate further-comprise commands to evaluate the plurality of potential cash flow time series and assign a probability to at least one cash flow.

12. The computer readable medium encoded with computer executable commands of claim 10, wherein the commands to estimate further comprise commands to determine a range of possible cash flow outcomes.

13. The computer readable medium encoded with computer executable commands of claim 10, wherein the commands to generate a new net cash flow time series comprise commands to:

multiply a portion of the drawdown time series of the aggregate net cash flow time series by a first scalar coefficient;

multiply a different portion of the drawdown time series of the aggregate net cash flow time series by a second scalar coefficient; and multiply a portion of the distribution time series of the aggregate net cash flow time series by a third scalar coefficient.

14. The computer readable medium encoded with computer executable commands of claim 13, wherein, the portion of the drawdown time series of the aggregate net cash flow time series multiplied by the first scalar coefficient is the portion of the drawdown time series up to a period of maximum depth selected so as to be statistically consistent with statistics of the speed of the net cash flow time series data of the plurality of investment instruments;

the different portion of the drawdown time series of the aggregate net cash flow time series multiplied by the second scalar coefficient is the portion of the drawdown time series after the period of maximum depth selected so as to be statistically consistent with statistics of the speed of the net cash flow time series data of the plurality of investment instruments; and the portion of the distribution time series of the aggregate net cash flow time series multiplied by the third scalar coefficient is the portion of the distribution time series after the period of maximum depth selected so as to be statistically consistent with statistics of the speed of the net cash flow time series data of the plurality of investment instruments.

15. The computer readable medium encoded with computer executable commands of claim 13, wherein the first, second, and third scalar coefficients are obtain by solving a system of three equations involving the four characterizing parameters MM, IRR, depth, and speed, where the four characterizing parameters inserted into the system of three equations are values selected so as to be statistically consistent with the statistics of the four characterizing parameters of the net cash flow time series data of the plurality of investment instruments, and the first, second, and third scalar coefficients are the only unknowns of the system of three equations.

16. The computer readable medium encoded with computer executable commands of claim 13, wherein the scalar coefficients are calculated by solving the following system of equations:

$$-\alpha * s_{1,k} + \overline{s_{1,k}} = \text{depth}$$

$$MM * (\alpha * s_{1,k} + \alpha' * s_{k+1,n}) = \overline{s_{1,k}} + \overline{s_{k+1,n}} * \beta$$

$$\overline{p_{1,k}} + \overline{p_{k+1,n}} * \beta = \alpha * p_{1,k} + \alpha' * p_{k+1,n}$$

for $\alpha$, $\alpha'$, and $\beta$, and wherein:

$\alpha$ is the first scalar coefficient;
$\alpha'$ is the second scalar coefficient;
$\beta$ is the third scalar coefficient;
$s_{1,k} = c_1 + \ldots + c_k$;
$s_{k+1,n} = c_{k+1} + \ldots + c_n$;
$\overline{s_{1,k}} = \overline{c_1} + \ldots + \overline{c_k}$;
$\overline{s_{k+1,n}} = \overline{c_{k+1}} + \ldots + \overline{c_n}$;
$p_{1,k} = c_1 e^{-r/4} + \ldots + c_k e^{-k*r/4}$;
$p_{k+1,n} = c_{k+1} e^{-(k+1)*r/4} + \ldots + c_n e^{-n*r/4}$;
$\overline{p_{1,k}} = \overline{c_1} e^{-r/4} + \ldots + \overline{c_k} e^{-k*r/4}$;
$\overline{p_{k+1,n}} = \overline{c_{k+1}} e^{-(k+1)r/4} + \ldots + \overline{c_n} e^{-n*r/4}$;

where $c_1, \ldots, c_k, \ldots, c_n$ represents the draw down time series of the aggregate net cash flow time series, $\overline{c_1}, \ldots, \overline{c_k}, \ldots, \overline{c_n}$ represents the distribution time series of the aggregate net cash flow time series, and k is the period of maximum depth selected so as to be statistically consistent with statistics of the speed of the net cash flow time series data of the plurality of investment instruments, depth is a depth selected so as to be statistically consistent with statistics of the depth of the net cash flow time series data of the plurality of investment instruments;

MM is an MM selected so as to be statistically consistent with statistics of the MM of the net cash flow time series data of the plurality of investment instruments; and r is an IRR selected so as to be statistically consistent with statistics of the IRR of the net cash flow time series data of the plurality of investment instruments.

17. The computer readable medium encoded with computer executable commands of claim 10, wherein the statistics of the four characterizing parameters comprise the average and the standard deviation of each of the MM and IRR of the net cash flow time series data of the plurality of investment instruments and the mean and standard deviation of each of the depth and speed of the net cash flow time series data of the plurality of investment instruments.

18. The computer readable medium encoded with computer executable commands of claim 10, wherein the investment instrument is a private equity fund.

19. The computer readable medium encoded with computer executable commands of claim 18, wherein the investment instrument is a buy-out or venture capital private equity fund.

20. The computer readable medium encoded with computer executable commands of claim 10, wherein the plurality of investment instruments comprise a plurality of private equity funds for a given vintage year.

21. A computer-implemented method for estimating expected cash flow of an investment instrument, preformed on one or more computers, said method comprising:

simulating via a computer a net cash flow time series of an investment instrument in which the net cash flow time series is comprised of a draw down time series and a distribution time series and the net cash flow time series is characterized by four characterizing parameters comprising money multiple ("MM"), internal rate of return ("IRR"), maximum depth ("depth"), and speed to maximum depth ("speed"), said method performed on one or more computers and comprising:

storing aggregate net cash flow time series data on a computer readable storage medium, said aggregate net cash flow time series data comprising the aggregated net cash flow time series data of a plurality of investment instruments;

storing statistics of the four characterizing parameters of the net cash flow time series data of the plurality of investment instruments on the computer readable medium; and transforming, via the computer, the stored aggregate net cash flow time series data to generate a new net cash flow time series, by accessing at least a portion of the stored aggregate net cash flow time series data and multiplying the accessed aggregate net cash flow time series data by one or more scalar coefficients;

wherein the one or more scalar coefficients are calculated such that the four characterizing parameters of the new net cash flow time series are statistically consistent with the statistics of the four characterizing parameters of the net cash flow time series data of the plurality of investment instruments.

22. A computer-implemented method of estimating expected cash flow of an investment instrument, performed on one or more computers, said method comprising:
(A) simulating via a computer a net cash flow time series of an investment instrument in which the net cash flow time series is comprised of a draw down time series and a distribution time series and the net cash flow time series is characterized by four characterizing parameters comprising money multiple ("MM"), internal rate of return ("IRR"), maximum depth ("depth"), and speed to maximum depth ("speed"), said simulating comprising:
(1) storing on an electronic storage medium aggregate net cash flow time series data comprising the aggregated net cash flow time series data of a plurality of investment instruments;
(2) storing on the electronic storage medium statistics of the four characterizing parameters of the net cash flow time series data of the plurality of investment instruments; and
(3) transforming via the computer said aggregate net cash flow time series data to generate a new net cash flow time series, by multiplying at least a portion of the stored aggregate net cash flow time series data by one or more scalar coefficients;
wherein the one or more scalar coefficients are calculated such that the four characterizing parameters of the new net cash flow time series are statistically consistent with the statistics of the four characterizing parameters of the net cash flow time series data of the plurality of investment instruments;
(B) repeating said simulating a plurality of times to generate a plurality of new net cash flow time series;
(C) generating via the computer a plurality of potential cash flow time series for the investment instrument, each of the potential cash flow time series being modeled after one of the plurality of new net cash flow time series;
(D) estimating expected cash flow from the plurality of potential cash flow time series; and
(E) storing said expected cash flow in a computer readable medium for displaying said expected cash flow on a computer display.

23. A computer system for estimating expected cash flow of an investment instrument, said computer system comprising at least one processor and electronic storage media, said computer system configured to:
simulate a net cash flow time series of an investment instrument in which the net cash flow time series is comprised of a draw down time series and a distribution time series and the net cash flow time series is characterized by four characterizing parameters comprising money multiple ("MM"), internal rate of return ("IRR"), maximum depth ("depth"), and speed to maximum depth ("speed"), said computer system comprising at least one microprocessor and electronic storage media, wherein the at least one microprocessor is configured to fetch and execute instructions stored in the electronic storage media, said instructions instructing the at least one microprocessor to:

store in the electronic storage media aggregate net cash flow time series data comprising the aggregated net cash flow time series data of a plurality of investment instruments;
store in the electronic storage media statistics of the four characterizing parameters of the net cash flow time series data of the plurality of investment instruments;
transform the aggregate net cash flow time series data to generate a new net cash flow time series, by accessing and multiplying at least a portion of the stored aggregate net cash flow time series data by one or more scalar coefficients; and
store the new net cash flow time series in the electronic storage media,
wherein the one or more scalar coefficients are calculated such that the four characterizing parameters of the new net cash flow time series are statistically consistent with the statistics of the four characterizing parameters of the net cash flow time series data of the plurality of investment instruments.

24. A computer system for estimating expected cash flow of an investment instrument, said computer system comprising at least one processor and electronic storage media, said computer system configured to:
(A) simulate a net cash flow time series of an investment instrument in which the net cash flow time series is comprised of a draw down time series and a distribution time series and the net cash flow time series is characterized by four characterizing parameters comprising money multiple ("MM"), internal rate of return ("IRR"), maximum depth ("depth"), and speed to maximum depth ("speed"), wherein said simulating includes:
(1) storing in the electronic storage media aggregate net cash flow time series data comprising the aggregated net cash flow time series data of a plurality of investment instruments;
(2) storing in the electronic storage media statistics of the four characterizing parameters of the net cash flow time series data of the plurality of investment instruments; and
(3) transforming, by the computer system, the aggregate net cash flow time series data to generate a new net cash flow time series, by accessing and multiplying at least a portion of the stored aggregate net cash flow time series data by one or more scalar coefficients;
wherein the one or more scalar coefficients are calculated such that the four characterizing parameters of the new net cash flow time series are statistically consistent with the statistics of the four characterizing parameters of the net cash flow time series data of the plurality of investment instruments;
(B) repeat said simulating a plurality of times to generate a plurality of new net cash flow time series;
(C) generate a plurality of potential cash flow time series for the investment instrument, each of the potential cash flow time series being modeled after one of the plurality of new net cash flow time series;
(D) estimate expected cash flow from the plurality of potential cash flow time series; and
(E) store said cash flow in the electronic storage media.

* * * * *

UNITED STATES PATENT AND TRADEMARK OFFICE
CERTIFICATE OF CORRECTION

PATENT NO.        : 7,657,478 B2
APPLICATION NO. : 11/333541
DATED             : February 2, 2010
INVENTOR(S)       : De Diego Arozamena et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1029 days.

Signed and Sealed this

Thirtieth Day of November, 2010

David J. Kappos
*Director of the United States Patent and Trademark Office*